July 3, 1951 C. P. YAGLOU 2,558,805
PRESSURE MEASURING
Filed Aug. 9, 1946

INVENTOR.
Constantin P. Yaglou
BY
W. J. Ccleston,
ATTORNEY

Patented July 3, 1951

2,558,805

UNITED STATES PATENT OFFICE 2,558,805

PRESSURE MEASURING

Constantin P. Yaglou, Belmont, Mass., assignor to the United States of America as represented by the Secretary of War Application August 9, 1946, Serial No. 689,344

8 Claims. (Cl. 73—172)

This invention relates to apparatus for pressure measuring, and is particularly applicable to the measurement of pressures on the inside of garments, and particularly of shoes while being actually worn.

In the designing of new patterns for tight-fitting garments, and particularly in the designing of shoes, it is imperative to know whether the new design conforms to the configuration of the human body, or whether friction between garment and body results. If excessive pressures exist at any particular spot of the garment such as a shoe, the design must be modified in order to avoid discomfort to the wearer. While obviously no shoe or other garment can ever be designed that fits all persons regardless of size, nevertheless general designs can be worked out which, when reproduced in customary tariff sizes, will fit a normally developed person of the particular size. Heretofore, the development of new types of shoes and other garments has been accomplished by methods of trial and error; the new design is tried out on test persons, and their opinions as to comfort or discomfort caused by the new design are taken into consideration in the question of the desirability of changing the design. Comfort or discomfort, however, is very much a matter of personal opinion and incapable of scientific standardization.

It is therefore a specific object of the present invention to provide apparatus for the measurement of pressures inside a shoe or other garment on the body of the wearer.

An accompanying object of this invention is the standardization of new designs for shoes and other garments.

Another principal object of the present invention is a pneumatic pressure meter of the manometer type with electrically operated indicator means.

A further object of the present invention is an arrangement whereby the exact equalization of pneumatic pressure in a pressure-measuring instrument of the manometer type with the pressure of the body to be measured can be determined.

Still another object of my invention is a simple, inexpensive and exact manometer pressure measuring device which can be read by simply observing the conventional pressure scale at the correct moment indicated by the device itself.

Further objects and advantages of my invention will become apparent in the course of the following description of the same.

The objects of my invention are carried out by means of one or more inflatable bladders which support on their inside a pair of electric contacts connected to a circuit which in turn is operably connected to an electric lamp or other indicator means. The bladder is operably connected to a conventional pneumatic manometer, e. g., of the pressure-bulb type. When the pneumatic pressure supplied to the inside of the bladder by the pressure bulb equals the pressure exerted on the outside of the bladder by the objects to be measured, the bladder begins to inflate, which causes contacts to separate and the circuit to be interrupted. The interruption of the circuit is indicated by the lamp or other indicating means, and the operator reads the manometric pressure at that very instant.

The following drawings illustrate a preferred embodiment of my invention by way of example, but are not intended to limit the scope of my invention to that particular example.

Figure 1:
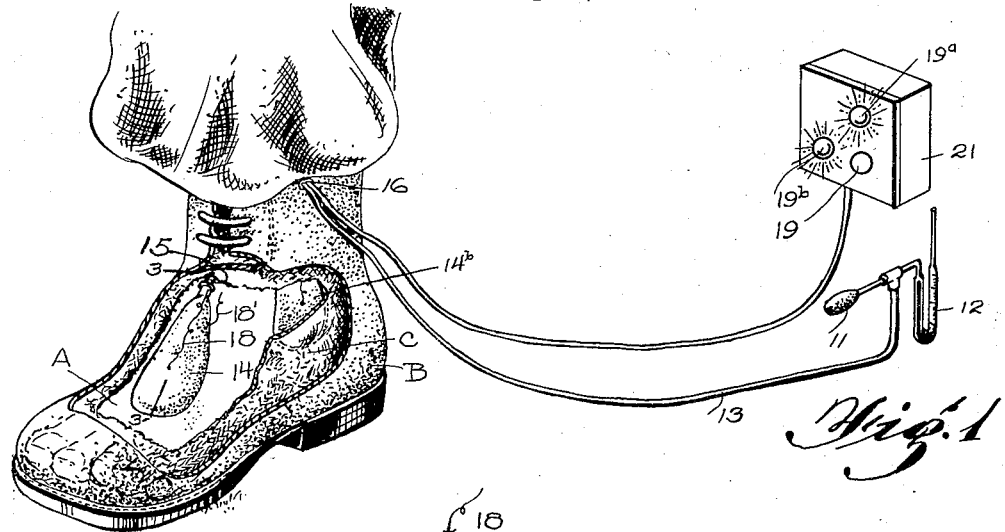
Fig. 1 is a perspective view (partly broken away) of a pressure-measuring apparatus in accordance with my invention.
Figure 3:
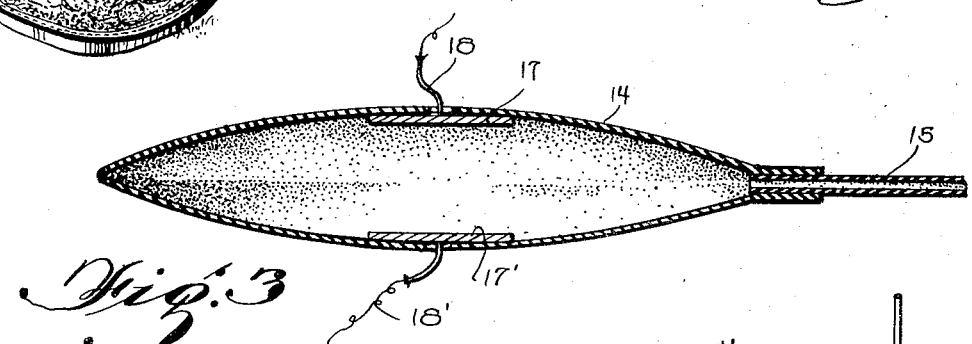
Fig. 3 is a section through line 3—3 of Fig. 1, and illustrates in detail one of the flexible, contact-supporting bladders in inflated, circuit-interrupting position.
Figure 2:
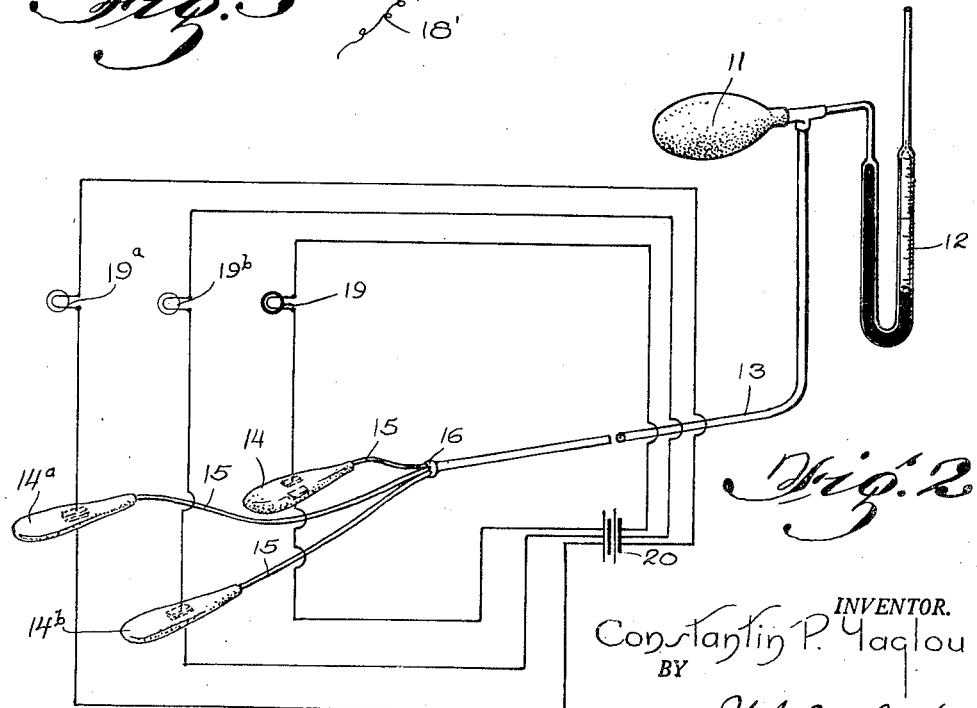
Fig. 2 is a diagrammatic view of the operating parts of my pressure-measuring apparatus and of the electrically operated indicator means associated therewith.

More particularly, reference numeral 11 denotes a pneumatic pressure bulb as it is conventionally used in sphygmomanometers and other pressure-measuring devices of the pneumatic type. Bulb 11 connects to a graded scale 12, such as a mercury U-tube; a flexible tube 13 leads from pressure bulb 11 to one or more flexible bladders 14, 14a, 14b. Where more than one bladder is used, tube 13 is branched into several inlet tubes 15 at manifold 16. Each bladder supports on its inside a pair of electric contacts 17, 17', which are connected to current-carrying wires 18, 18'. Incandescent lamp or lamps 19, 19a, 19b are in the circuits which are fed by battery 20 or other current supply means. Lamps 19, 19a, 19b are advantageously mounted on a panel 21.

The operation of the device will now be described with particular reference to the measurement of pressures inside a shoe. A number of bladders 14 are sewn to a sock which is put on the foot A of the wearer, and a shoe B is put on over the sock C. Inasmuch as bladders 14, 14a, 14b are deflated, contacts 17, 17' touch each other and the circuit of which the contacts are a part is closed. Consequently, all lamps 19, 19a, 19b are lighted. Pneumatic pressure is now brought to bear on the inside of bladders 14, 14a, 14b by working bulb 11. At the instant when the pressure exerted on a bladder by the foot and shoe equals the pressure introduced to the inside of the bladder from bulb 11, the bladder commences to inflate and contacts 17, 17' separate, thereby breaking the circuit, which causes the lamp connected to that particular circuit to go out. The operator who observes panel 21 now reads the pressure indicated by scale 12, which is the internal pressure at the particular spot where the bladder is located. The operator continues to work bulb 11 until the next bladder begins to inflate, causing another lamp to go out. The pressure is again noted on scale 12. This process is continued until readings corresponding to all the bladders have been taken. Inasmuch as the location of the bladders inside the shoe is known beforehand, and each bladder can be identified by the lamp connected thereto, the pressure inside the shoe at pertinent points thereof, e. g., instep, ankle, arch, is immediately analyzed. If the pressure inside another garment, for instance, a flying suit, is to be measured, the bladders are supported in appropriate places on long underwear or other flexible supports. The measuring then takes place in the same manner as has been described in connection with a shoe.

My apparatus will be found useful in the designing of children's shoes. A test of a new design for a child's shoe with my apparatus and method produces accurate data while to test the design by merely placing it on a child's foot and then asking his opinion about its merits would be futile.

The above-described apparatus may, of course, be used in exactly the same manner in testing new designs of corsets, girdles or similar devices.

My apparatus is likewise useful in the fitting of individual garments to individual users. Alterations of the garment may be made at points of excessive pressure indicated by the apparatus.

My apparatus may, of course, be designed to cooperate with other than visual indicator means; for instance, the lamp may be substituted by a buzzer or other acoustic means. Also, a circuit-making device may be employed instead of a circuit-breaking device.

These and other modifications, as well as application of my invention to purposes other than those enumerated above, will readily occur to the expert, and the scope of my invention therefore is to be circumscribed only by the appended claims.

I claim:

1. A pressure meter comprising inflatable means, a plurality of contacts supported on the inside of said inflatable means, said contacts being in contact with each other when said inflatable means are deflated and out of contact with each other when said inflatable means are inflated, pneumatic pressure applying means operably associated with said inflatable means for inflating the same, a pressure indicating scale associated with said pneumatic pressure applying means, and electrically operable means electrically connected to said contacts for indicating the engagement and disengagement of said contacts.

2. A pressure meter comprising a plurality of inflatable means, a plurality of contacts supported on the inside of each of said inflatable means, said contacts being in contact with each other when said inflatable means are deflated and out of contact with each other when said inflatable means are inflated, pneumatic pressure applying means operably associated with said plurality of inflatable means for inflating the same, a pressure indicating scale associated with said pneumatic pressure applying means, and a plurality of electrically operable means electrically connected to said contacts in said plurality of inflatable means for indicating the engagement and disengagement of said contacts in said inflatable means.

3. An apparatus for measuring the pressure inside a garment, comprising an inflatable bladder, a pair of contacts supported inside said bladder in contact with each other when said bladder is deflated and out of contact with each other when said bladder is inflated, said contacts being connected to an electric circuit, indicator means in said circuit, pneumatic pressure applying means for inflating said bladder and operably connected to the same, and a manometer scale associated with said pneumatic pressure applying means.

4. An apparatus for measuring the pressure inside a garment, comprising an inflatable bladder, a pair of contacts supported inside said bladder in contact with each other when said bladder is deflated and out of contact with each other when said bladder is inflated, said contacts being connected to an electric circuit, an electric lamp in said circuit, pneumatic pressure applying means for inflating said bladder and operably connected to the same, and a manometer scale associated with said pneumatic pressure applying means.

5. An apparatus for measuring the pressure at various points inside a garment, comprising a plurality of inflatable bladders, a flexible circuit for said bladders, a pair of contacts supported inside each of said bladders in such a manner that said contacts are in contact with each other when the bladder supporting the same is deflated and out of contact with each other when the bladder supporting the same is inflated, said contacts being connected to an electric circuit, visual indicator means in said circuit operable by said contacts, pneumatic pressure applying means for inflating said bladders and a manometer associated with said pneumatic pressure applying means.

6. An apparatus for measuring the pressure inside a shoe, comprising an inflatable bladder, a pair of contacts supported inside said bladder in contact with each other when said bladder is deflated and out of contact with each other when said bladder is inflated, said contacts being connected to an electric circuit, indicator means in said circuit, pneumatic pressure applying means for inflating said bladder and operably connected to the same, and a manometer scale associated with said pneumatic pressure applying means.

7. An apparatus for measuring the pressure inside a shoe, comprising an inflatable bladder, a pair of contacts supported inside said bladder in contact with each other when said bladder is deflated and out of contact with each other when said bladder is inflated, said contacts being connected to an electric circuit, an electric lamp in said circuit, pneumatic pressure applying means for inflating said bladder and operably connected to the same, and a manometer scale associated with said pneumatic pressure applying means.

8. An apparatus for measuring the pressure at various points inside a shoe, comprising a plurality of inflatable bladders, a flexible circuit for said bladders, a pair of contacts supported inside each of said bladders in such a manner that said contacts are in contact with each other when the bladder supporting the same is deflated and out of contact with each other when the bladder supporting the same is inflated, said contacts being connected to an electric circuit, visual indicator means in said circuit operable by said contacts, pneumatic pressure applying means for inflating said bladders and a manometer associated with said pneumatic pressure applying means.

CONSTANTIN P. YAGLOU.

REFERENCES CITED

The following references are of record in the file of this patent:

UNITED STATES PATENTS

| Number | Name | Date |
| --- | --- | --- |
| 932,050 | McFarlane | Aug. 24, 1909 |
| 1,629,732 | Phelps | May 24, 1927 |
| 1,860,209 | Slough | May 24, 1932 |
| 2,290,387 | Schwartz | July 21, 1942 |